United States Patent

Oo et al.

(10) Patent No.: US 9,614,385 B2
(45) Date of Patent: Apr. 4, 2017

(54) APPARATUS AND METHOD FOR FULL-ORIENTATION OVER-THE-AIR CHARGING IN PORTABLE ELECTRONIC DEVICES

(71) Applicant: MOTOROLA SOLUTIONS, INC, Schaumburg, IL (US)

(72) Inventors: Wei Lun Oo, Penang (MY); Chee Khon Chong, Penang (MY); Sin Keng Lee, Penang (MY)

(73) Assignee: MOTOROLA SOLUTIONS, INC., Chicago, IL (US)

(*) Notice: Subject to any disclaimer, the term of this patent is extended or adjusted under 35 U.S.C. 154(b) by 107 days.

(21) Appl. No.: 14/541,494

(22) Filed: Nov. 14, 2014

(65) Prior Publication Data

US 2016/0141899 A1    May 19, 2016

(51) Int. Cl.
*H02J 7/00* (2006.01)
*H02J 7/02* (2016.01)
*H02J 50/10* (2016.01)
*H01F 38/14* (2006.01)

(52) U.S. Cl.
CPC ............ *H02J 7/0044* (2013.01); *H01F 38/14* (2013.01); *H02J 7/025* (2013.01); *H02J 50/10* (2016.02); *Y02B 40/90* (2013.01)

(58) Field of Classification Search
CPC .................................................... H02J 7/0044
See application file for complete search history.

(56) References Cited

U.S. PATENT DOCUMENTS

| 8,461,801 | B2 | 6/2013 | Chen | |
|---|---|---|---|---|
| 8,841,882 | B2 | 9/2014 | Sato | |
| 2010/0277120 | A1* | 11/2010 | Cook | H01Q 19/005 320/108 |
| 2012/0248893 | A1* | 10/2012 | Teggatz | H01F 38/14 307/104 |
| 2013/0328407 | A1* | 12/2013 | Shimura | H02J 7/025 307/104 |
| 2014/0065948 | A1* | 3/2014 | Huang | H05K 5/0086 455/7 |
| 2014/0143933 | A1 | 5/2014 | Low et al. | |

(Continued)

FOREIGN PATENT DOCUMENTS

| WO | 2010093723 A1 | 8/2010 |
|---|---|---|
| WO | 2010129369 A2 | 11/2010 |
| WO | 2013093922 A2 | 6/2013 |

*Primary Examiner* — Drew A Dunn
*Assistant Examiner* — Tynese McDaniel
(74) *Attorney, Agent, or Firm* — Barbara R. Doutre; Lawrence A. Barrata, Jr.

(57) ABSTRACT

An apparatus and method for full-orientation over-the-air charging includes a receiver coil associated with a portable electronic device for wireless charging; and a repeater coil associated with a device selectively configured to engage or support the portable electronic device for wireless charging, wherein the device is one of a cover, holster, or case for the portable electronic device; wherein, when the device is selectively engaged or supporting the portable electronic device, a portion of the repeater coil overlaps a portion of the receiver coil forming a magnetic coupling therebetween and supporting wireless charging of the portable electronic device in a plurality of orientations of the portable electronic device relative to a transmitter coil.

18 Claims, 8 Drawing Sheets

(56) References Cited

U.S. PATENT DOCUMENTS

| | | |
|---|---|---|
| 2014/0177139 A1 | 6/2014 | Kari |
| 2014/0191584 A1* | 7/2014 | Kato .................... H02J 7/0044 |
| | | 307/104 |
| 2014/0217965 A1 | 8/2014 | Van Wiemeersch et al. |
| 2015/0015082 A1* | 1/2015 | Kanagawa .............. H02J 5/005 |
| | | 307/104 |

* cited by examiner

APPARATUS AND METHOD FOR FULL-ORIENTATION OVER-THE-AIR CHARGING IN PORTABLE ELECTRONIC DEVICES

BACKGROUND OF THE INVENTION

The present disclosure relates generally to Over-the-Air (OTA) wireless charging capabilities in portable electronic devices. Conventional smart phones, radios, and other devices with wireless charging capabilities have their receiver (RX) coils located on or at the back of the device, e.g. embedded in the device or as an attachment in the form of a jacket on the back of the device. This is because the front of the device is utilized to accommodate large screen displays and, optionally, a keypad, buttons, or other mechanisms for user input. Due to the form factor of portable devices, it is not possible to have receiver coils on a front side of the device. Accordingly, receiver coils have been located on or at the back of the device to wirelessly charge with corresponding transmitter (TX) coils. However, if the receiver coils are facing away from the transmitter coil, such as when the front of the device is facing the transmitter coil, then the power transfer efficiency is significantly affected due to a metal chassis in the device blocking some portion of the magnetic coupling between the transmitter and receiver coils, as expected. Furthermore, the thickness of the device introduces additional distance between the transmitter and receiver coils in this orientation, such as when the front of the device is facing the transmitter coil.

Accordingly, there is a need for an apparatus and method for full-orientation OTA charging in portable electronic devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
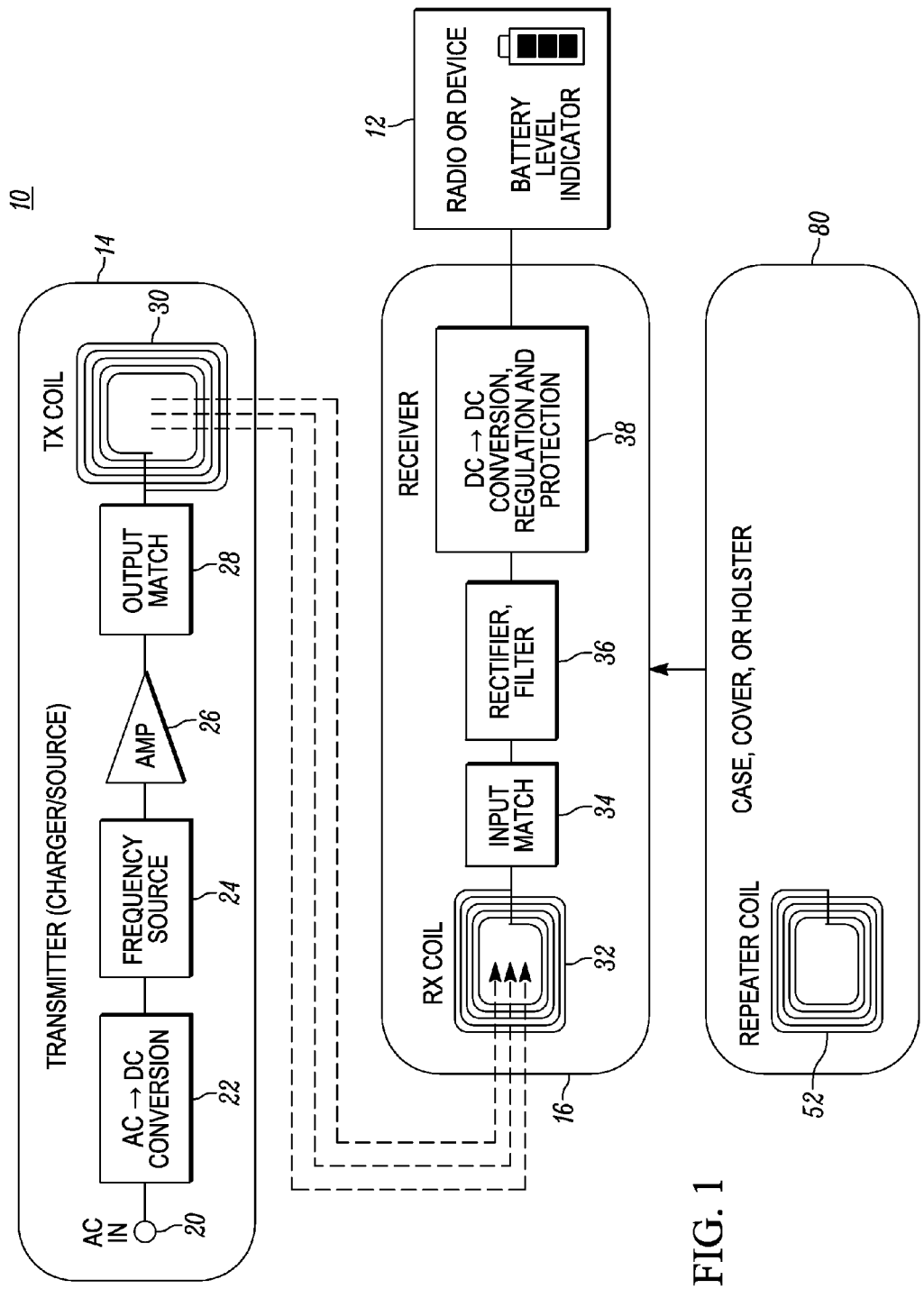
FIG. 1 is a block diagram of a wireless charging system, which can be used to wirelessly charge a portable electronic device or the like in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a portable electronic device system for wirelessly charging a portable electronic device includes a receiver coil associated with the portable electronic device for wireless charging; and a repeater coil associated with a device selectively configured to engage or support the portable electronic device for wireless charging, wherein the device is one of a cover, holster, or case for the portable electronic device; wherein, when the device is selectively engaged or supporting the portable electronic device, a portion of the repeater coil overlaps a portion of the receiver coil forming a magnetic coupling therebetween and supporting wireless charging of the portable electronic device in a plurality of orientations of the portable electronic device relative to a transmitter coil.

In another exemplary embodiment, a coil arrangement for wirelessly charging a portable electronic device includes a receiver coil associated with the portable electronic device for wireless charging, wherein the receiver coil occupies two planes with a first portion of the receiver coil in a first plane and a second portion of the receiver coil in a second plane; wherein the receiver coil is configured to operate cooperatively with a repeater coil disposed in a device selectively engaged to the portable electronic device for, wherein the device is one of a cover, holster, or case for the portable electronic device; and wherein the repeater coil occupies two planes with a first portion of the repeater coil in a first plane and a second portion of the repeater coil in a second plane, the second portion of the repeater coil and the second portion of the receiver coil form a magnetic coupling therebetween, and the first portion of the repeater coil and the first portion of the receiver coil have substantially no magnetic coupling therebetween due to a metal chassis and ferrite layer of the portable electronic device.

In a further exemplary embodiment, a method for wirelessly charging a portable electronic device includes engaging the portable electronic device with a device covering at least a front side and a bottom portion of the portable electronic device, wherein the device is one of a cover, holster, or case for the portable electronic device, wherein the portable electronic device has a receiver coil for wireless charging and the device has a repeater coil for wireless charging; and wirelessly charging the portable electronic device, in a plurality of orientations, with the receiver coil and the repeater coil operating cooperatively.

In various exemplary embodiments, an apparatus and method for full-orientation OTA charging is described which enables a portable electronic device to wirelessly charge regardless of orientation relative to a transmitter coil. In an exemplary embodiment, the apparatus and method include a repeater coil cooperatively operating with a receiver coil associated with the electronic device. The repeater coil can be located in a holster, case, cover, or the like associated with the electronic device with the holster, case, cover, etc. placed over at least a front side and a bottom portion of the electronic device. The repeater coil is similar to the receiver coil and overlaps a portion of the receiver coil, forming a unified receiver coil that enables full-orientation OTA charging. For example, the repeater coil and the receiver coil can overlap at the bottom portion of the electronic device, for strong magnetic coupling, thereby providing wireless charging regardless of orientation.

FIG. 1 is a block diagram of a wireless charging system 10, which can be used to wirelessly charge a portable electronic device 12 or the like. The wireless charging system 10 includes a transmitter 14 which is a charger/power source and a receiver 16. The transmitter 14 can be located in a charging station, on a charging mat, in a vehicle (e.g., in an arm rest, in a console, etc.), and the like. The receiver 16 is located in or attached to the portable electronic device 12. In operation, the transmitter 14 provides power to the receiver 16 wirelessly OTA, to recharge the portable electronic device 12. The advantage of OTA charging is that the portable electronic device 12 does not physically have to connect to the transmitter 14 for charging to occur. Rather, the charging occurs when the transmitter 14 and the receiver are in proximity to one another, such as when the portable electronic device 12 is laid on a mat, placed in a holder in a vehicle, etc. Charging can occur with the Tx and Rx separated with a distance of up to 15 cm. This includes charging the portable electronic device 12 worn on a belt or placed in the pocket of the user from a Tx coil embedded in the arm rest or the car seat.

The transmitter 14 can include an input power source 20 (e.g. Alternative Current (AC) or the like), a power converter 22 (e.g., AC to Direct Current (DC)), a frequency source 24, an amplifier 26, an output match 28, and a transmitter coil 30. In operation, these components in the transmitter 14 are configured to output an alternating current in the Tx coil 30 which generates a magnetic field to enable energy transfer to the receiver 16 via magnetic resonance induction. The receiver 16 can include a receiver coil 50, an input match 34, a rectifier/filter 36, a DC-DC conversion, regulation, and protection circuit 38, and a connection to a battery in the portable electronic device 12. The receiver coil 50 receives the magnetic field from the transmitter coil 30 and utilizes the components in the receiver 16 to charge the battery in the portable electronic device 12.

In accordance with the various embodiments described herein, a repeater coil 52 is provided, within an associated case, cover, or holster device 80, to operate cooperatively with the receiver coil 50. As is described herein, the repeater coil 52 enables full-orientation charging relative to the transmitter coil 30 as well as improves charging distance. Further, since the repeater coil 52 is part of the device 80, the repeater coil 52 can be located on a front side of the portable electronic device 12, i.e. the repeater coil 52 is present when the device 80 is selectively engaged or holding the portable electronic device 12.

Figure 2:
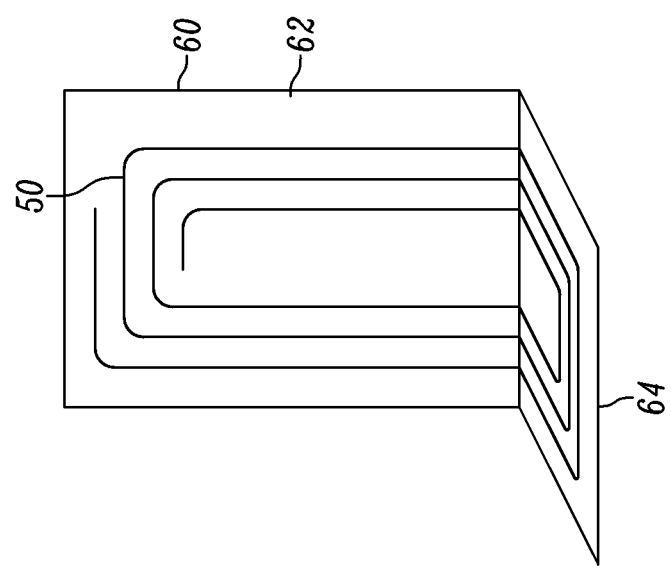
FIG. 2 is a perspective diagram of a receiver coil in accordance with some embodiments.
Figure 3:
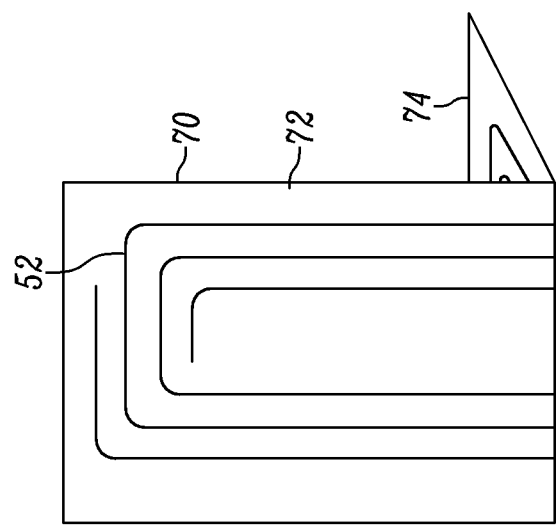
FIG. 3 is a perspective diagram of a repeater coil in accordance with some embodiments.

FIGS. 2 and 3 are perspective diagrams of a receiver coil 50 and a repeater coil 52 for full-orientation charging. FIG. 2 is a perspective diagram of the receiver coil 50, FIG. 3 is a perspective diagram of the repeater coil 52. In FIGS. 2 and 3, the receiver coil 50 and the repeater coil 52 are each orthogonally arranged such that the coils 50, 52 are each in different planes. The receiver coil 50 is disposed on, attached to, or formed in a flexible substrate 60 which includes an approximately 90 degree bend between a first portion 62 of the flexible substrate 60 and a second portion 64 of the flexible substrate 60. The receiver coil 50 is located on both the portions 62, 64 and includes the approximately 90 degree bend.

Similarly, the repeater coil 52 is disposed on, attached to, or formed in a flexible substrate 70 which includes an approximately 90 degree bend between a first portion 72 of the flexible substrate 70 and a second portion 74 of the flexible substrate 70. The repeater coil 52 is located on both the portions 72, 74 and includes the approximately 90 degree bend. The flexible substrates 60, 70 can be the same or different materials. Further, the receiver coil 50 and the repeater coil 52 can be substantially identical to one another. Also, the coils 50, 52 can be said to form an L-shape based on the portions 62, 64 and 72, 74 being orthogonal to one another, i.e. due to the approximately 90 degree bend.

Figure 5:
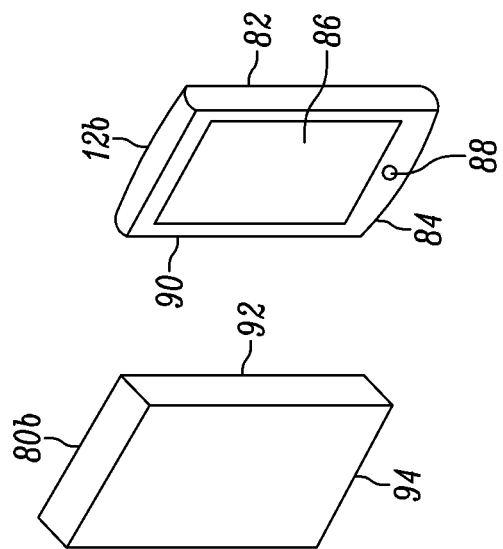
FIG. 5 is a perspective diagram of another exemplary portable electronic device and associated case, cover, or holster devices in accordance with some embodiments.
Figure 4:
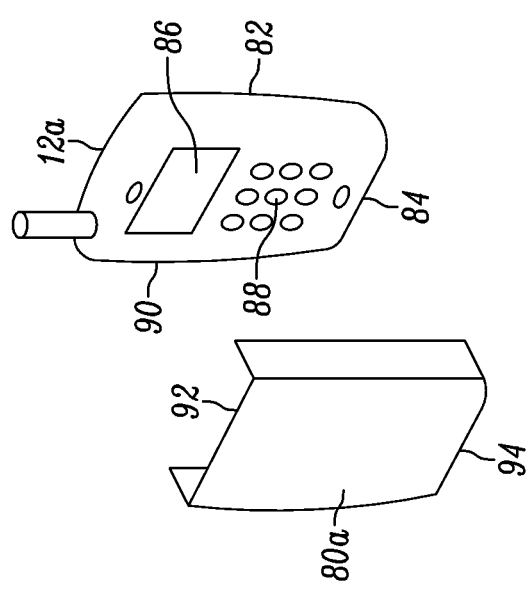
FIG. 4 is a perspective diagram of an exemplary portable electronic device and associated case, cover, or holster devices in accordance with some embodiments.

FIGS. 4 and 5 are perspective diagrams of exemplary portable electronic devices 12a, 12b and associated cases, cover, or holster devices 80a, 80b. The portable electronic devices 12a, 12b can include, without limitation, smart phones, radios, tablets, or any other portable electronic device. The receiver coil 50 and the flexible substrate 60 are associated with the portable electronic device 12a, 12b. For example, the flexible substrate 60 can be embedded in, disposed on, attached to, etc. a back side 82 and a bottom portion 84 of the portable electronic devices 12a, 12b. Again, as described herein, it is not feasible to include receiver coils or portions thereof on a front side of the portable electronic devices 12a, 12b due to a display 86 and/or user interface mechanisms 88 (e.g., buttons, keypad, etc.).

The cases, cover, or holster devices 80a, 80b are configured to selectively engage or support the portable electronic device 12a, 12b, such as for storage and transport when the devices 80a, 80b are cases or covers or for attachment and support when the devices 80a, 80b are holsters. That is, the devices 80a, 80b are configured to selectively cover a front side 90 of the portable electronic devices 12a, 12b. Since the cases, cover, or holster devices 80a, 80b are configured to selectively cover the front portion of the portable electronic device 12a, 12b, the repeater coil 52 and the flexible substrate 70 is embedded in, disposed on, attached to, etc. an interior 92 and a bottom portion 94 of the devices 80a, 80b.

When the cases, cover, or holster devices 80a, 80b are selectively engaged or supporting the portable electronic device 12a, 12b, the portion 74 of the repeater coil 52 overlaps the portion 64 of the receiver coil 50 forming a magnetic coupling therebetween and supporting wireless charging of the portable electronic device 12a, 12b in a plurality of orientations of the portable electronic device 12a, 12b relative to the transmitter coil 30. Note, conventional repeater coils are planar and facing the receiver coil. When a metal plate (e.g. a chassis of the portable electronic device 12a, 12b) exists in between the repeater coil and the receiver coil, it will block the magnetic coupling between them. Thus, the apparatus and method described herein has both the receiver coil 50 and the repeater coil 52 bent to the bottom side 84 of the portable electronic device 12a, 12b, with an overlap, for strong magnetic coupling.

Figure 7:
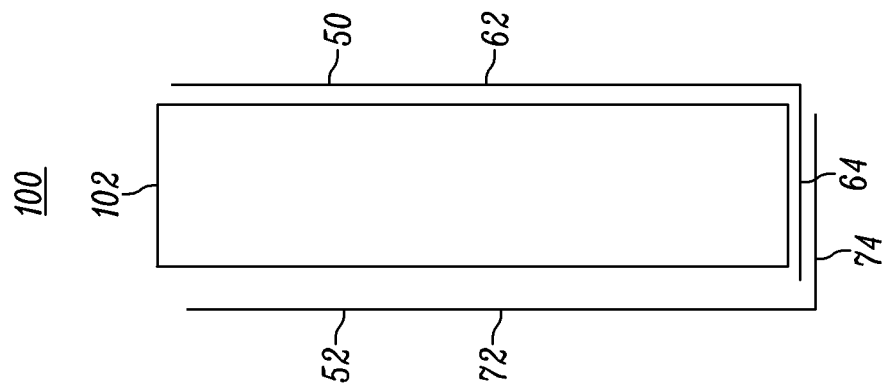
FIG. 7 is a side diagram of the coil arrangement of FIG. 4 in accordance with some embodiments.
Figure 6:
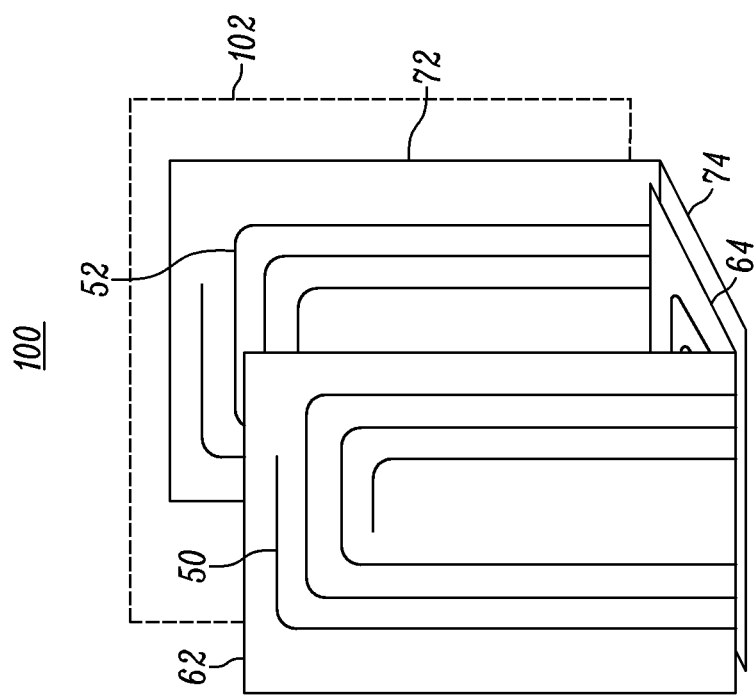
FIG. 6 is a perspective diagram of the receiver coil of FIG. 2 and the repeater coil of FIG. 3 in the coil arrangement in accordance with some embodiments.

FIG. 6 is a perspective diagram of the receiver coil 50 and the repeater coil 52 in the coil arrangement 100, and FIG. 7 is a side diagram of the coil arrangement 100, illustrating the coils 50, 52 when the devices 80a, 80b are engaged to the portable electronic devices 12a, 12b. Here, in FIGS. 6 and 7, the coils 50, 52 are shown outside of the portable electronic device 12a, 12b and the device 80a, 80b for illustration purposes. The coil arrangement 100 enables the portable electronic device 12a, 12b to charge regardless which face, either the front side 90 or the back side 82, is facing the transmission coil 30. Again, the repeater coil 52, which has a flex form and can be substantially identical to the receiver coil 50, is placed in a typical holster, case, or cover and wrapped around the bottom of the holster, case, or cover to form an L-shape. The coil arrangement 100 further includes both the receiver coil 50 and the repeater coil 52 bent at the bottom of portable electronic device 12a, 12b radio, with an overlap, for strong magnetic coupling. In an exemplary embodiment, the L-shaped receiver coil 50 can be embedded in a battery, associated with the portable electronic device 12a, 12b, and the L-shaped repeater coil 52 can be embedded in a holster.

Note, in both FIGS. 6 and 7, the first portion 62 of the receiver coil 50 is separated by the first portion 72 of the repeater coil 52 by a metal plate 102, which can be in or part of a chassis associated with the portable electronic device 12a, 12b. The second portion 64 of the receiver coil 50 overlaps, partially or fully, with the second portion of the repeater coil 52, for strong magnetic coupling therebetween. Thus, in an exemplary embodiment, the receiver coil 50 and the repeater coil 52 are both L-shaped, with one of their planes overlapping each other, for magnetic coupling, while the other plane is separated by a metal plate and ferrite layers that was placed between the metal chassis of the portable device and the receiver coil 50 for shielding purposes. Shielding of the magnetic fields is to reduce the adverse effect of metal/magnetic objects in the portable device on the magnetic coupling for wireless charging which degrades efficiency, as well as, to prevent interference in the electronic circuits of the portable device caused by the magnetic fields generated for wireless charging.

In an exemplary embodiment, the receiver coil 50 and associated components in the receiver 16 are embedded in a battery for the portable electronic device 12a, 12b, whereas the repeater coil 52 is embedded in the case, cover, or holster device 80a, 80b. The repeater coil 52, when the case, cover, or holster device 80a, 80b is engaged with the portable electronic device 12a, 12b, enhances the magnetic coupling to the receiver coil 50. The repeater coil 52 has no conductive terminals that connect to the battery or the portable electronic device 12a, 12b. Also, the repeater coil 52 does not physically connect to the receiver coil 50. Collectively, the receiver coil 50 and the repeater coil 52 can operate as a unified receiver coil, which is the receiver coil 50 in the wireless charging system 10.

Figure 8:
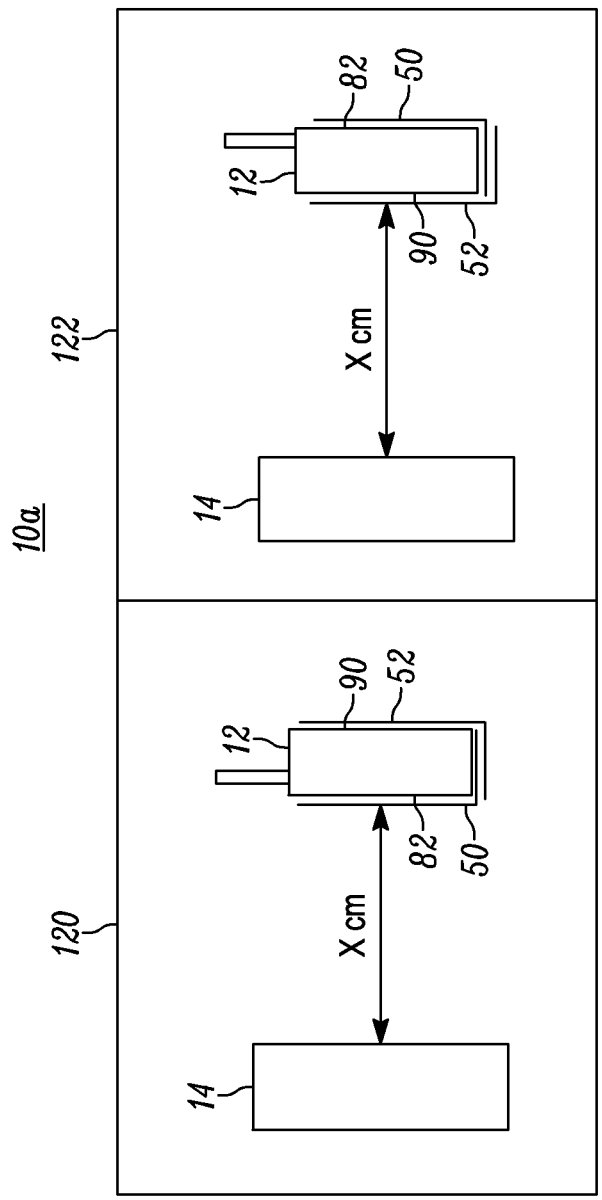
FIG. 8 is a block diagram of a wireless charging system showing the portable electronic device engaged to a case, cover, or holster device in different orientations in accordance with some embodiments.

FIG. 8 is a block diagram of a wireless charging system 10a showing the portable electronic device 12 engaged to a case, cover, or holster device 80 forming the coil arrangement 100 in different orientations 120, 122. The wireless charging system 10a allows wireless charging of the portable electronic device 12 in a plurality of orientations, with the case, cover, or holster device 80 engaged. Specifically, FIG. 8 illustrates the orientation 120 where the back side 82 of the portable electronic device 12 faces the transmitter 14, and the orientation 122 where the front side 90 of the portable electronic device 12 faces the transmitter 14. Another orientation could include the bottom portion 84 facing the transmitter 14. Also, the sides or a top portion of the portable electronic device 12 could face the transmitter 14, but this configuration would not be as efficient as the orientations 120, 122 or with the bottom portion 84 facing the transmitter. Note, as described herein, full-orientation includes either side 82, 84, 90 of the portable electronic device 12 facing the transmitter 14.

Also, the portable electronic device 12 can wirelessly charge when it is removed from the device 80 and placed on a wireless charging pad independent of the device 80, as well as, full-orientation OTA charging of the portable electronic device 12 combined with the device 80 worn on a user, e.g. as a holster. That is, without the device 80, the portable electronic device 12 still includes the receiver coil 50 which can be used for wireless charging independent of the repeater coil 52.

With respect to distance, without the repeater coil 52, the portable electronic device 12 with only the receiver coil 50 can either sit on the transmitter 14 (as a wireless charging pad) or needs to be oriented with the receiver coil 50 facing the transmitter 14. The repeater coil 52 with the receiver coil 50 enables the portable electronic device 12 to efficiently charge at a same distance regardless of which side 82, 90 faces the transmitter 14. Also, the addition of the repeater coil 52 slightly increases an overall distance to the transmitter 14, relative to the receiver coil 50 only.

In an exemplary embodiment, the transmitter 14 can be a wireless charging pad, a wireless charging station, a wireless charging box, etc. For example, the transmitter 14 can be embedded in a vehicle such as in a console. In an exemplary use case, the portable electronic device 12 can be a public safety radio or the like. It is critical here to ensure proper charging of the portable electronic device 12 for mission critical applications. The transmitter 14 can be embedded in a console in a vehicle, such that when the portable electronic device 12 is placed in a holster 80 in the vehicle, it automatically charges wirelessly. Various other applications are also contemplated.

In an exemplary embodiment, the wireless charging system 10a was built and tested as shown in FIG. 8. Here, the receiver coil 50 was embedded in a battery of the portable electronic device 12 and the repeater coil 52 was embedded in a holster device 80. Results showed that the repeater coil 52 embedded in the holster device 80 increased the charging distance from about 5 to 12 cm in the orientation where the front side 90 of the portable electronic device 12 (display and keypad) is facing the transmitter coil 30. The wireless charging system 10a was tested and showed a capability to charge at a distance up to 12 cm away from the transmitter 14 in either of the orientations 120, 122. It is expected, with better-optimized matching, that the charging distance can be increased to 15 cm or greater.

Figure 9:
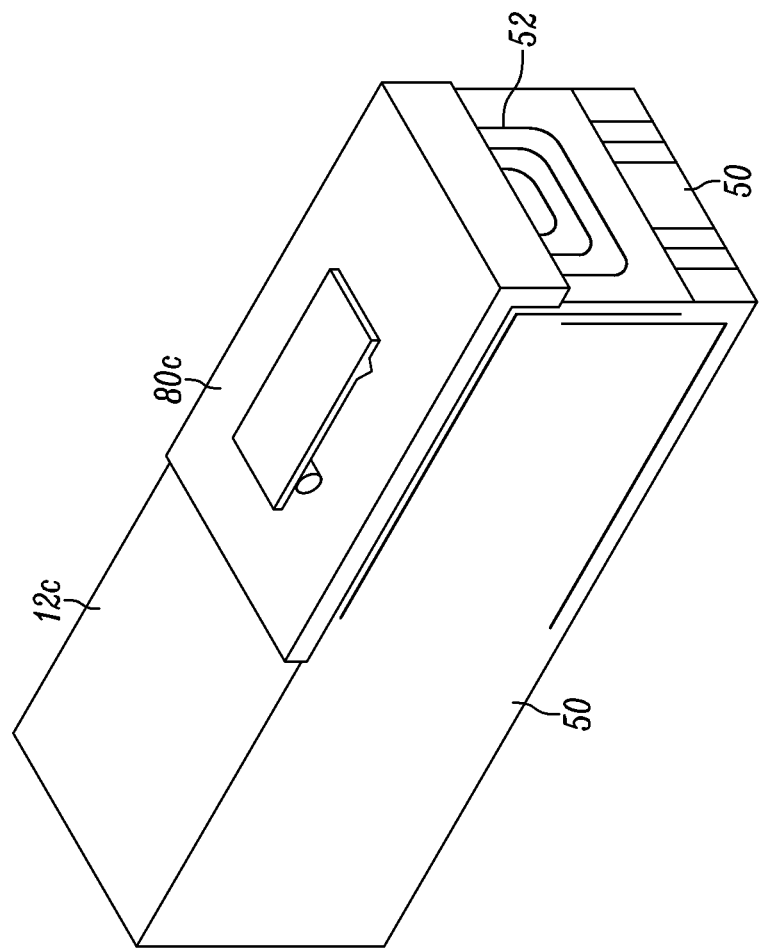
FIG. 9 is a perspective diagram of an exemplary portable electronic device engaged to a holster with the associated coils in accordance with some embodiments.
Figure 10:
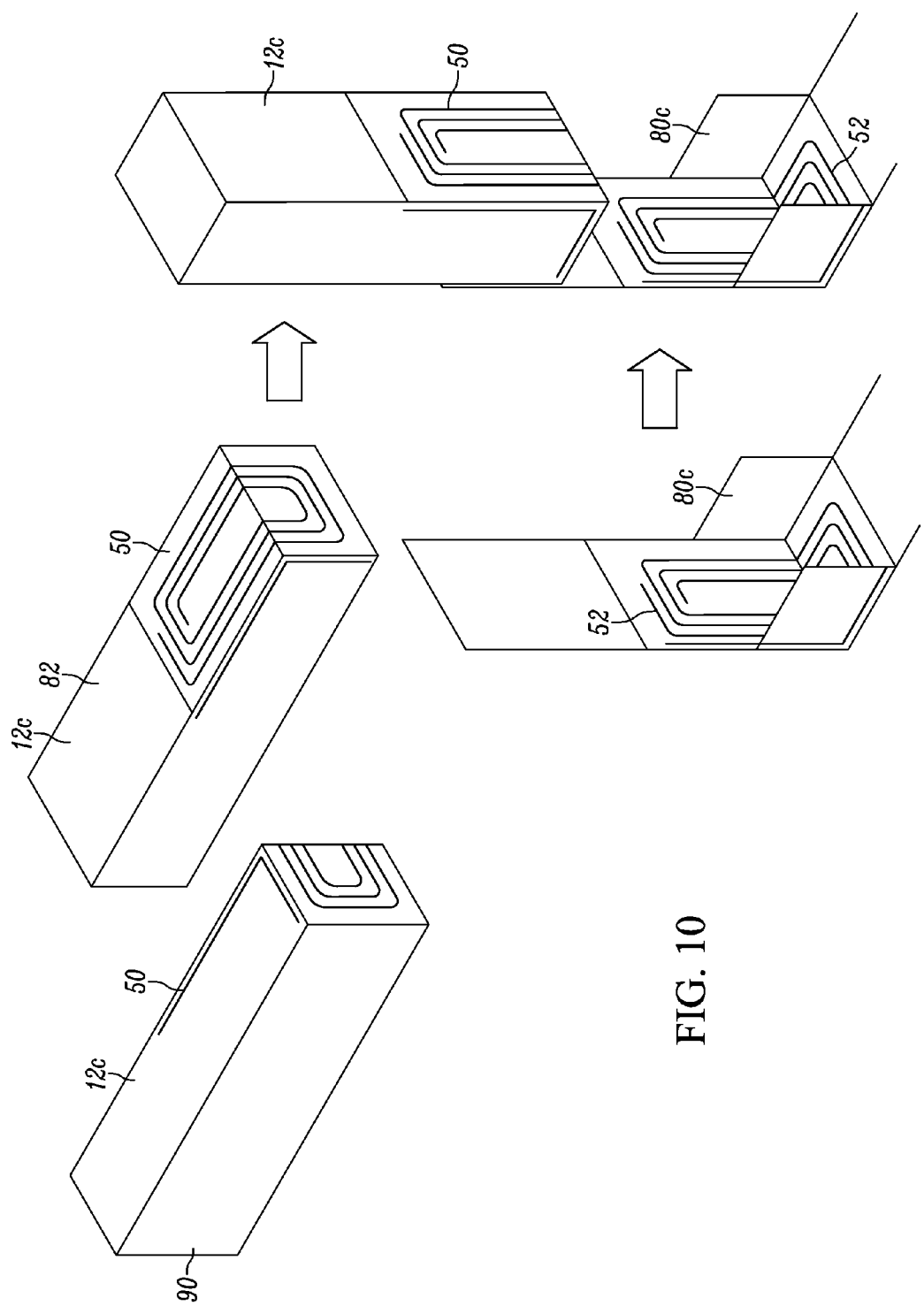
FIG. 10 is a perspective diagram of various views of the portable electronic device and the holster from FIG. 9 in accordance with some embodiments.

FIG. 9 is a perspective diagram of an exemplary portable electronic device 12c engaged to a holster 80c with the associated coils 50, 52. FIG. 10 is a perspective diagram of various views of the portable electronic device 12c and the holster 80c. In an exemplary embodiment, the portable electronic device 12c can be an APX radio from Motorola Solutions, Inc. For illustration purposes in FIGS. 9 and 10, the coils 50, 52 are shown on an exterior of the portable electronic device 12c and the holster 80c. Of note, the coils 50, 52 can be embedded, attached, or disposed in the portable electronic device 12c and the holster 80c.

Figure 11:
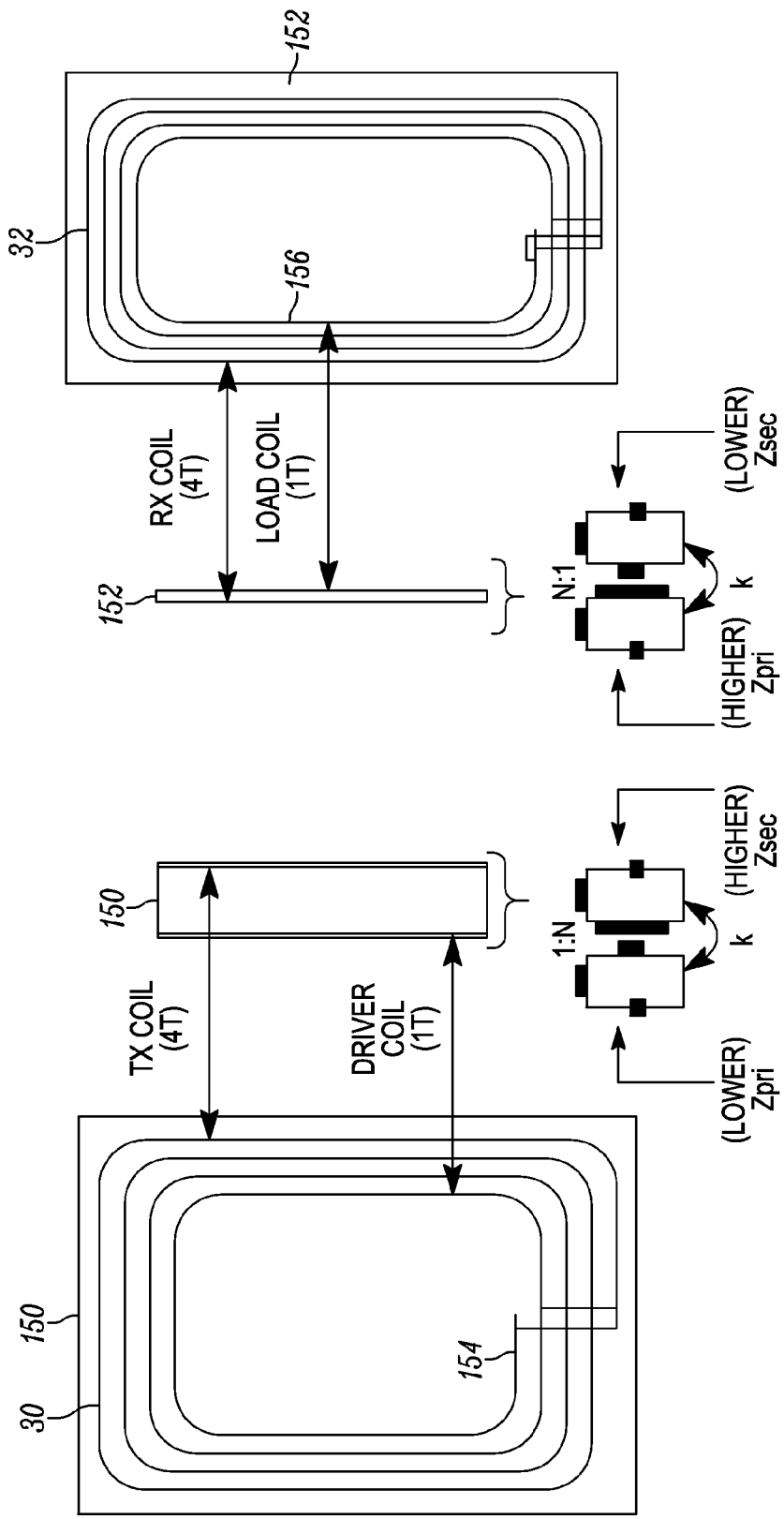
FIG. 11 is a diagram of an implementation of the transmitter coil and the receiver coil in the wireless charging system of FIG. 1.

FIG. 11 is a diagram of an implementation of the transmitter coil 30 and the receiver coil 50 in the wireless charging system 10. The transmitter coil 30 is on a two-layer Printed Circuit Board (PCB) 150, and the receiver coil 50 is on a two-layer flex 152. To mitigate impedance matching difficulties due to the high impedance of the transmitter coil 30 and the receiver coil 50, a single-turn driver coil 154 is placed in close proximity to the transmitter coil 30 (on different sides of the two-layer PCB 150), and a single-turn load coil 156 is placed in close proximity to the receiver coil 50 (on different sides of the two-layer flex 152). The combination of the single-turn driver coil 154 and the transmitter coil 30 is an impedance transformer. The combination of the single-turn load coil 156 and the receiver coil 32 is another impedance transformer. It is possible for some smaller coils where the impedance is low enough that either the driver coil 154 or the load coil 156 or both of them is not needed. These lower down the impedances seen at the input and output ports, whereby the turn ratio (N) between the transmitter coil 30 and the driver coil 154, or between the receiver coil 32 and the load coil 156, determines the impedance ratio by a factor of ($N^2$). When the receiver coil 50 is bent 90 degree to form the L-shape, the load coil 156 on the same piece of the two-layer flex 152 follows the receiver coil 50 to form an L-shape.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable electronic device system for wirelessly charging a portable electronic device, the portable electronic device system comprising:
  a receiver coil associated with the portable electronic device for wireless charging; and
  a repeater coil associated with a device selectively configured to engage or support the portable electronic device for wireless charging, wherein the device is one of a cover, holster, or case for the portable electronic device;
  wherein the receiver coil occupies two planes with a first portion of the receiver coil in a first plane and a second portion of the receiver coil in a second plane;

wherein the repeater coil occupies two planes with a first portion of the repeater coil in a first plane and a second portion of the repeater coil in a second plane, the second portion of the repeater coil and the second portion of the receiver coil form a magnetic coupling therebetween, and the first portion of the repeater coil and the first portion of the receiver coil having substantially no magnetic coupling therebetween due to a chassis of the portable electronic device; and wherein, when the device is selectively engaged or supporting the portable electronic device, a portion of the repeater coil overlaps a portion of the receiver coil forming a magnetic coupling therebetween and supporting wireless charging of the portable electronic device in a plurality of orientations of the portable electronic device relative to a transmitter coil.

2. The portable electronic device system of claim 1, wherein the plurality of orientations comprise a front side of the portable electronic device facing the transmitter coil and a back side of the portable electronic device facing the transmitter coil and a bottom side of the portable electronic device facing the transmitter coil.

3. The portable electronic device system of claim 1, wherein the receiver coil and the repeater coil each are L-shaped with a bottom portion of each overlapping forming a magnetic coupling therebetween.

4. The portable electronic device system of claim 1, wherein the receiver coil is located on or at a back side and a bottom side of the portable electronic device, and the repeater coil is located on or at an inside and a bottom side of the device.

5. The portable electronic device system of claim 1, wherein the receiver coil and the repeater coil are formed on a flexible substrate with an approximately 90 degree bend therein.

6. The portable electronic device system of claim 1, wherein the device is configured to cover a front side of the portable electronic device, the front side of the portable electronic device comprises a display and user interface mechanisms which prevent inclusion of a coil in the portable electronic device at the front side.

7. The portable electronic device system of claim 1, wherein the receiver coil is coupled to a battery associated with the portable electronic device and the repeater coil is not physically connected to the battery or the receiver coil.

8. A coil arrangement for wirelessly charging a portable electronic device, the coil arrangement comprising:
a receiver coil associated with the portable electronic device for wireless charging, wherein the receiver coil occupies two planes with a first portion of the receiver coil in a first plane and a second portion of the receiver coil in a second plane;
wherein the receiver coil is configured to operate cooperatively with a repeater coil disposed in a device selectively engaged to the portable electronic device, wherein the device is one of a cover, holster, or case for the portable electronic device; and
wherein the repeater coil occupies two planes with a first portion of the repeater coil in a first plane and a second portion of the repeater coil in a second plane, the second portion of the repeater coil and the second portion of the receiver coil form a magnetic coupling therebetween, and the first portion of the repeater coil and the first portion of the receiver coil have substantially no magnetic coupling therebetween due to a chassis of the portable electronic device.

9. The coil arrangement of claim 8, wherein the receiver coil and the repeater coil each are L-shaped with a bottom portion of each overlapping forming a magnetic coupling therebetween.

10. The coil arrangement of claim 8, wherein the receiver coil is located on or at a back side and a bottom side of the portable electronic device, and the repeater coil is located on or at an inside and a bottom side of the device.

11. The coil arrangement of claim 8, wherein the receiver coil and the repeater coil are formed on a flexible substrate with an approximately 90 degree bend therein.

12. The coil arrangement of claim 8, wherein the device is configured to cover a front side of the portable electronic device, the front side of the portable electronic device comprises a display and user interface mechanisms which prevent inclusion of a coil in the portable electronic device at the front side.

13. The coil arrangement of claim 8, wherein the receiver coil is coupled to a battery associated with the portable electronic device and the repeater coil is not physically connected to the battery or the receiver coil.

14. The coil arrangement of claim 8, wherein the receiver coil and the repeater coil support charging of the portable electronic device in a plurality of orientations relative to a transmitter coil.

15. The coil arrangement of claim 14, wherein the plurality of orientations comprise a front side of the portable electronic device facing the transmitter coil and a back side of the portable electronic device facing the transmitter coil.

16. A method for wirelessly charging a portable electronic device, the method comprising:
engaging the portable electronic device with a device covering at least a front side and a bottom portion of the portable electronic device, wherein the device is one of a cover, holster, or case for the portable electronic device, wherein the portable electronic device has a receiver coil for wireless charging and the device has a repeater coil for wireless charging, wherein the receiver coil occupies two planes with a first portion of the receiver coil in a first plane and a second portion of the receiver coil in a second plane; and
wherein the repeater coil occupies two planes with a first portion of the repeater coil in a first plane and a second portion of the repeater coil in a second plane, the second portion of the repeater coil and the second portion of the receiver coil form a magnetic coupling therebetween, and the first portion of the repeater coil and the first portion of the receiver coil have substantially no magnetic coupling therebetween due to a chassis of the portable electronic device; and
wirelessly charging the portable electronic device, in a plurality of orientations, with the receiver coil and the repeater coil operating cooperatively.

17. The method of claim 16, wherein the plurality of orientations comprise a front side of the portable electronic device facing a transmitter coil and a back side of the portable electronic device facing the transmitter coil; and
wherein the receiver coil and the repeater coil each are L-shaped with a bottom portion of each overlapping forming a magnetic coupling therebetween.

18. The method of claim 16, wherein the receiver coil is located on or at a back side and a bottom side of the portable electronic device, and the repeater coil is located on or at an inside and a bottom side of the device.

* * * * *